United States Patent [19]

Pepin

[11] Patent Number: 4,954,926
[45] Date of Patent: Sep. 4, 1990

[54] THICK FILM CONDUCTOR COMPOSITION

[75] Inventor: John G. Pepin, Newark, Del.

[73] Assignee: E. I. Du Pont de Nemours and Company, Wilmington, Del.

[21] Appl. No.: 385,309

[22] Filed: Jul. 28, 1989

[51] Int. Cl.$^5$ .................. H01G 1/015; H01G 4/10
[52] U.S. Cl. ............................. 361/304; 361/321
[58] Field of Search ............... 361/320, 321, 305, 303, 361/304; 29/25.42

[56] References Cited

U.S. PATENT DOCUMENTS 3,851,228  11/1974  Sheard .......................... 361/321 X
4,325,763   4/1982  Utsumi et al. ................. 361/321 X Primary Examiner—Donald A. Griffin

[57] ABSTRACT

A thick film conductor composition suitable for use for electrodes in multilayer capacitors comprising (a) finely divided particles of electrically conductive metal, metal oxide precursors or alloys of the conductive metals, or mixtures thereof, dispersed in (b) an organic medium comprising
  (1) an organometallic compound, the metal or metal oxide moiety of which is insoluble in the electrically conductive metal and/or the oxide(s) of the metal moiety are non-reducing in the presence of the electrically conductive metal, the organometallic compound being dissolved in;
  (2) a solution of polymeric binder and volatilizable solvent.

10 Claims, No Drawings

THICK FILM CONDUCTOR COMPOSITION

FIELD OF THE INVENTION

The invention is directed to thick film conductor compositions which are particularly suitable for use as electrodes for multilayer capacitors.

BACKGROUND OF THE INVENTION

Multilayer ceramic capacitors consist of a plurality of interleaved and staggered layers of an electrically conductive film of metal (termed "electrode"), formed by the deposition (usually by screen printing or variations thereof) of a thick film paste (termed an "electrode composition") and electrically insulating layers of a ceramic oxide (termed "dielectric"), formed by laying a cast dielectric tape or by casting a dielectric slurry over the dried electrode. Such capacitors are well-known in the art. U.S. Pat. No. 2,389,420, for example, describes the structure, manufacture and properties of monolithic multilayer ceramic capacitors.

The electrode composition is usually a dispersion of finely divided precious metal powders such as palladium, silver, gold, or platinum or their mixtures in a vehicle which is usually solely organic in nature. Dispersions of non-precious metals such as copper and nickel have also been shown to have utility in electrode compositions. The vehicle is usually composed of a mixture of a polymeric resin which imparts viscosity to the composition and appropriate solvents for processing compatibility, particularly with respect to drying. Other organic additives are usually made to the vehicle to control paste rheology. Typical electrode composition metal concentrations range from 40 to 70% by weight, with the remainder being vehicle. Electrode compositions are deposited, usually by screen printing techniques, on dried dielectric layers, then dried to remove solvents and leave a mixture of metal powders and resin from the vehicle.

The dielectric layer is usually composed of finely-divided oxide powders dispersed in a resin. Barium titanate ($BaTiO_3$) and other oxides such as neodymium titanate ($Nd_2Ti_2O_7$) and magnesium titanate ($MgTiO_3$) are used. Additions are usually made to these oxides to control various electrical characteristics, particularly to maximize dielectric constant while controlling the temperature dependence of dielectric constant and insulation resistance, among other properties. The resin is present in the dielectric layers to facilitate handling and printing of electrodes on the layers.

Multilayer ceramic capacitors are manufactured by building up an interleaved configuration of electrode and dielectric layers, dicing individual parts out of the build-up then subjecting the parts to a slow burnout and then high temperature firing. Burnout is done to remove the organic resin in the electrode and dielectric layers to avoid rapid outgassing and rupture of the parts. Firing is done to a peak temperature (the "dielectric maturation temperature") both to densify the dielectric for maximum dielectric constant and physical strength, and to react the chemical constituents of the dielectric so that other desired electrical characteristics are achieved. During the firing step, the powder grains in the electrode layers also sinter and densify so as to produce a continuous, highly electrically-conductive metal film.

A principal problem in multilayer ceramic capacitor manufacture originates from the firing of the electrode and dielectric films simultaneously. During firing, a common physical defect termed a "delamination" is formed. Delaminations are defined as separations of the electrode and dielectric layers which cause a void in what is meant to be a monolithic solid body. Delaminations are detrimental to finished capacitor performance since they can cause electrodes of opposite polarity to contact and form an electrical short. Delaminations can also trap liquid solutions used in subsequent processing. These solutions can leave electrical charge carriers in the delamination voids and reduce the insulation resistance of the finished part. For high parts yields, and maximum reliability of the finished parts, delaminations must be closely controlled, and preferably eliminated entirely.

The dielectric maturation temperature determines the metal powders used in the electrode. The metals are chosen so as to have melting points above the dielectric maturation temperature to avoid melting the electrode during firing and the formation of discontinuous fired metal films. For example, dielectrics which mature at 1350° C. require use of electrode compositions which contain only palladium, gold, or platinum powders or their mixtures, due to the high melting point of these metals and their alloys. Lower firing dielectrics, such as those which fire at 1100° C., typically permit use of electrode compositions which contain mixtures of palladium and silver in the weight ratio of 30%:70%. Dielectrics which can be fired in non-oxidizing atmospheres permit use of non-precious metal electrodes.

Dielectrics are usually designed to have the highest dielectric constant and other optimized electrical properties, while firing at the lowest possible maturation temperature so as to use inexpensive metals such as silver. To maximize dielectric constant, particularly in low (approximately 1100° C.) firing dielectric systems, a flux composed of a glass with softening points in the range of 500° to 700° C. is usually added to promote densification of the dielectric. Low melting fluxes which are crystalline in nature can also be used.

During firing of capacitors made with low-firing dielectrics, the electrode film begins to density first. This is due to the presence of large amounts of silver in the film. Silver has a melting point of about 962° C. and begins to sinter and densify at about 600° C. Dielectrics which mature at around 1100° C. typically begin to sinter and shrink at about 800° to 1000° C. The mismatch between the sintering shrinkage temperatures of the electrode and dielectric is a basic cause of delaminations.

In low fire dielectrics which contain a flux additive, these stresses due to differential shrinkage can be partially alleviated by flow of the molten flux additive. In addition, it is known in the art that addition of metal oxides to the electrode composition can move the sintering shrinkage of the electrode metal powders to higher temperatures to reduce mismatch with the dielectric and relieve the stresses formed due to differential electrode/dielectric shrinkage. Barium titanate, for example, is added as a sintering inhibitor since it will not adversely effect the electrical properties of the dielectric should some be incorporated into the dielectric layers during firing.

The key to the effectiveness of the sintering inhibitor additive is that it must be insoluble in the metals of the electrodes, and can be well-dispersed throughout the electrode paste composition so as to block interparticle contact of the electrode metal grains and keep them from sintering. In general, it is desired to add as little oxide inhibitor as possible to avoid increasing the electrical resistance of the fired electrode, yet ensure sintering shrinkage compatibility with the dielectric. But even with optimum additions of oxide sintering inhibitor, sintering shrinkage matching with the dielectric cannot be fully realized: the mechanism of stress relief due to flow of the flux additive cannot, in some cases, alleviate the stresses, and a single delamination or multiple delaminations will form.

This problem is exacerbated in the case of high firing dielectrics where flux additives are not present and high firing temperatures and long peak temperature soak times must be used to densify the dielectric. In this case also, additives such as barium titanate are used to avoid delaminations.

Furthermore, as dielectric technology advances, dielectrics which are intended to be matured at temperatures such as 1100° C. are being invented which contain fine-grained starting materials which require no flux additives to achieve maximum densification. U.S. Pat. No. 4,640,905, for example, describes such a material. Without these flux additives, the mechanism for alleviating sintering shrinkage mismatch is absent, and delaminations are likely to occur, even with the addition of conventional oxide sintering inhibitors. A more effective means of alleviating the mismatch of the sintering shrinkage of the electrode with the dielectric is needed.

SUMMARY OF THE INVENTION

In a primary aspect, the invention is directed to a thick film conductor composition suitable for use for electrodes in multilayer capacitors comprising
(a) finely divided particles of electrically conductive metal selected from Pd, Ag, Pt, Au, Cu, Ni, oxide precursors, and alloys of the aforesaid conductive metals, and mixtures thereof, dispersed in
(b) an organic medium comprising:
  (1) an organometallic compound the metal or metal oxide moiety of which is insoluble in the electrically conductive metal and/or the oxide(s) of the metal moiety are non-reducing in the presence of the electrically conductive metal, the organometallic compound being dissolved in;
  (2) a solution of polymeric binder and volatizable solvent, the amount of organometallic compound being such that the metal moiety thereof constitutes at least 0.05% by weight of the total composition.

PRIOR ART

Japanese Patent No. 9050924-B is directed to electrode pastes for use in ceramic capacitors consisting of conductive metal powders, such as Pd, Pt, Au, Ag, and Ag/Pd alloy, and organometallic compound powders dispersed in organic medium. When the composition is heated to 200°–400° C., the organometallic particles decompose to form the corresponding metal or metal oxides. When the composition is then fired at 1200°–1400° C., contact probability among the particles is reduced by the intervening metal or metal oxide particles thus avoiding discontinuous grain growth and the formation of large particles at the expense of smaller particles. The reference is concerned only with avoiding porous fired electrode films and is not directed to the problem of shrinkage.

DETAILED DESCRIPTION OF THE INVENTION

A. Conductive Metal

Conductive metals which can be used in the invention are Pd, Ag, Pt, Au, Cu, Ni, alloys of the aforementioned metals, and their oxide precursors.

As used herein, the term "oxide precursor" refers to metal oxides which under normal thick film firing conditions are reduced to the metallic zero valent form ($Me^o$).

The particle size distribution of the conductive metals is not critical with respect to the to the effectiveness of the invention, but as a practical matter, should be from 0.1–10 $\mu$m and preferably 0.3–3 $\mu$m, basis equivalent particle diameter. It is preferred that the metals be easily dispersed in the organic medium and non-flake in morphology.

B. Organometallic Compound

As used herein, the terms "organometallic compound" and "metal resinate" are used synonymously with respect to organic metallic compounds which are soluble in organic media.

One type of metal resinate is the reaction product of any of several organic compounds with a metal salt. The resulting compound is essentially a long chain organic molecule in which one site is occupied by one of a wide variety of metals. Another type of metal resinate is a chelate-type compound such as an organotitanate.

The composition of the organic moiety of the organometallic compound is not critical except that it must be pyrolyzable when the composition of the invention is fired in either oxidizing or non-oxidizing atmospheres. These organic moieties include carboxylate naphthenates, tallates, alcoholates and the like.

Suitable organometallic compounds may range from highly fluid to very viscous liquids and to solids as well. From the standpoint of use in the invention, the solubility of the resinates in the organic medium is of primary importance. Typically, metal resinates are soluble in organic solvents, particularly polar solvents such as toluene, methylene chloride, benzyl acetate, and the like. They may also be soluble in non-polar solvents such as mineral spirits. Metal resinates and metal resinate solutions of both noble metals and base metals are commercially available. Suitable noble metal resinates are those based on Ru, Rh, Re, Ir, Pt and mixtures thereof. Suitable base metal resinates are those based on Mg, Si, Ti, V, Cr, Mn, Fe, Co, Ni, Cu, Zn, Zr, Nb, Ba, Ce, Ta, W and mixtures thereof.

Suitable organotitanates are those disclosed in U.K. Patent No. 772,675 and particularly those in which the organotitanates are hydrolyzable metal alcoholates of titanium corresponding to the formula $(AO)_{4x-2y}TiO_y$ in which A is $C_{1-8}$ alkyl or a mixture of $C_{1-8}$ alkyl and $C_{1-8}$ acyl, O is an oxygen atom covalently bonding two titanium atoms, x is an integer from 1 to 12 and y is O or an integer from 1 to $3x/2$. The alkyl groups may be either straight chained or branched. Preferred organotitanates include titanium acetyl acetonate and tetraoctylene glycol titanium chelate. Other organotitanates of this type are disclosed in Ken-React Bul. No. KR-0278-7 Rev. (Kenrich Petrochemicals, Inc., Bayonne, NJ) and in Du Pont Bul. No. E-38961 entitled Versatile Tyzor Organic Titanates.

The metal resinates are used in the compositions of the invention in concentrations such that the metal or metal oxide content of the resinate constitutes 0.05-5% wt., of the total composition, and preferably 0.1-1% wt.

It is essential that the organometallic compound be soluble in the rest of the organic medium in order to effect complete and uniform dispersion of the compound within the organic medium. When such uniform dispersion is achieved, it is believed that the organometallic material attaches to the surface of the conductive metal particles and then, as firing continues, decomposes to form the corresponding metal or metal oxide before the conductive metal particles begin to sinter.

C. Polymeric Binder Solution

The second essential component of the organic medium is the solution of polymeric binder in an organic solvent. The main purpose of this part of the organic medium is to serve as a vehicle for dispersion of the finely divided solids of the composition in such form that it can readily be applied to ceramic or other substrates. Thus, this portion of the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling, and good firing properties. Satisfactory appearance of the fired composition is also important.

In view of these criteria, a wide variety of polymers and solvents can be used as the principal dispersion medium. The dispersion medium for most thick film compositions is typically a solution of resin in a solvent frequently also containing thixotropic agents and wetting agents. The solvent usually boils within the range of 130°-350° C.

By far the most frequently used resin for this purpose is ethyl cellulose. However, resins such as ethylhydroxyethyl cellulose, wood rosin, mixtures of ethyl cellulose and phenolic resins, polymethacrylates of lower alcohols, and monobutyl ether of ethylene glycol monoacetate can also be used.

Suitable solvents include kerosene, mineral spirits, dibutylphthalate, butyl carbitol, butyl carbitol acetate, hexylene glycol and high-boiling alcohols and alcohol esters. Various combinations of these and other solvents are formulated to obtain the desired viscosity, volatility and compatibility with dielectric tape. Water-soluble solvent systems can also be used.

Among the thixotropic agents which are commonly used are hydrogenated castor oil and derivatives thereof and ethyl cellulose. It is, of course, not always necessary to incorporate a thixotropic agent since the solvent/resin properties coupled with the shear thinning inherent in any suspension may alone be suitable in this regard. Suitable wetting agents include phosphate esters and soya lecithin.

The ratio of organic medium to solids in the paste dispersions can vary considerably and depends upon the manner in which the dispersion is to be applied and the kind of organic medium used. Normally, to achieve good coverage, the dispersions will contain complementally by weight 40-90% solids and 60-10% organic medium. The composition of the invention preferably contains 45-65% by weight metal solids and 55-35% by weight organic medium.

The pastes are conveniently prepared on a three-roll mill. The viscosity of the pastes is typically 0.1-300 Pa.s when measured at room temperature on Brookfield viscometers at low, moderate and high shear rates. The amount and type of organic medium (vehicle) utilized is determined mainly by the final desired formulation viscosity and print thickness.

The organic vehicle must give excellent dispersion and must burn out cleanly at a low temperature (400°-450° C.) in the firing cycle.

In view of these criteria, a preferred vehicle system for the present invention consists of ethyl hydroxyethyl cellulose dissolved in a mixture of beta-terpineol, mineral spirits and other solvents. Ethyl cellulose and other solvents can also be used. A thixotropic agent is generally added to give improved line resolution with screen printing.

D. Formulation and Application

The compositions of the invention are quite easy to prepare by dissolving the organometallic compound in the polymer/solvent solution, blending the conductive metal powder into the organic medium, and then milling the composition to effect a uniform and stable dispersion of the powder in the liquid medium.

The invention compositions are especially useful as the electrode materials for multilayer ceramic capacitors. A particular advantage of these thick film compositions is that the temperature range over which the electrodes undergo shrinkage during firing is increased markedly and thus the shrinkage of the electrode solids more nearly approaches that of the dielectric materials used in the insulating layers of the capacitors. This in turn gives a reduction in the frequency of delamination of the layers. This advantage is even greater when the compositions of the invention are used in multilayer capacitor applications in which the dielectric component contains little or no fluxing additive(s). The solids content of the composition of the invention is wholly conductive metal. Glass frits are not used therewith.

The invention will be more fully understood by reference to the Examples, which follow.

EXAMPLES

Examples 1-13

A standard electrode paste was prepared containing a Pd/Ag powder with Pd:Ag in the weight ratio of 30:70, with 1.5% wt. addition of a finely divided barium titanate standard sintering inhibitor, and a vehicle consisting of ethylhydroxyethyl cellulose dissolved in a mixture of alpha and beta terpineol. The paste was prepared using well-known roll-milling techniques, and formulated to a viscosity of 41.3 PaS and a solids (metal plus $BaTiO_3$) of 60.73% wt. as measured by 1050 C pyrolysis.

To aliquots of this paste, 1% wt. additions of various solutions of organometallic sintering inhibitors were added. The solutions contained from 1.8 to 25.9% wt. of the organometallic material. These organometallics were inorganic salts of carboxylic acids such as 2-ethylhexoic acid, naphthenoic acid, tall oil fatty acids, neodecanoic acid, iso-nonanoic acid, and the like, dissolved in organic vehicle containing aromatic and/or aliphatic hydrocarbons. Commercially available inorganic resinates in similar solutions were also tested. The additives were first stirred into the pastes, then the aliquots were again roll-milled to ensure maximum dispersion of the additive.

Table 1 lists the metal constituents of the various additives tested. The control was a paste aliquot which contained only barium titanate sintering inhibitor; no organometallic was present (sample 13).

The temperature range between room temperature and 800° C. is the critical temperature range for the formation of delaminations in multilayer ceramic capacitors. It is in this range that the electrode begins to densify, yet the dielectric has not begun to sinter and shrink. The multilayer ceramic capacitor body is especially prone to delaminations since the organic binder present in both the electrode and dielectric layers is burned out.

The effect of the additives on the sintering shrinkage of the electrodes was measured using dilatometry. A 20 mil thick film of the electrode paste was cast on an alumina substrate and dried until all paste solvent was removed. This resulted in roughly a 100 to 300 micron thick dried paste film. The substrates were mounted into a dilatometer and the shrinkage as a function of temperature was measured. Firing conditions were 10 C/minute, with heating done from room temperature to 1100° C. Shrinkage of the film, measured in microns, was measured throughout the firing cycle, and used to calculate the percent shrinkage relative to the unfired dried film thickness.

All told, 13 samples were measured, 12 with an organometallic additive (examples 1-12) and 1 (example 13) with no additive. Referred to the table, sample 13 shrank a total of 66.55% after firing to 1000° C., as defined relative to its unfired thickness. After firing to 800° C., sample 13 shrank to 53.45% of unfired thickness. In the table, the last column of numbers lists the shrinkage which occurred after firing to 800° C. as a fraction of the shrinkage which occurred after firing to 1000° C. For example 13, this value is (53.45/66.55)*100=80.32%. The amount of shrinkage in the temperature range from room temperature to 800° C. is the critical factor in forming delaminations in multilayer ceramic capacitors. Minimizing the fraction of total shrinkage occurring in this temperature range is a key to controlling the likelihood of delaminations forming in the fired capacitor. Any remaining shrinkage in the electrode film occurring above 1000° C. is of less consequence since this is the range in which the dielectric also shrinks.

In the case of sample 13, where only the barium titanate sintering inhibitor present, 80.31% of shrinkage at 1000° C. (where the dielectric begins to densify) has occurred in the electrode layers by 800° C. In some cases, this amount of shrinkage can be tolerated and no delaminations will occur. But in most cases, this extent of sintering shrinkage mismatch is not tolerable, and a delamination will occur in the fired capacitor.

In the cases of samples 1, 2, 3, 6, 7, and 8, the sintering inhibitor additive has a marked effect in reducing the amount of sintering shrinkage in this range. Less total shrinkage occurs in the temperature range up to 800° C., resulting in less sintering shrinkage mismatch with the dielectric. Electrodes prepared with these additives would be more compatible with most dielectric types, and produce fewer delaminations.

Samples 9-12 show little effect of the additive, indicating these additives are not good candidates for controlling sintering shrinkage in electrode compositions.

Samples 4 and 5 (Pb and Cu organometallics) actually were seen to promote electrode densification in that they produced more shrinkage in the range up to 800° C. than sample 13 with no organometallic additives.

TABLE 1

| Example | Metal Moiety | % Total Shrinkage at 10000° C. | % Total Shrinkage at 800° C. | %/A - Total Shrinkage 25-800° C. |
|---|---|---|---|---|
| 1 | Rh | 41.97 | 21.1 | 50.30 |
| 2 | Ni | 33.43 | 16.11 | 48.19 |
| 3 | Cr | 37.93 | 26.79 | 70.63 |
| 4 | Pb | 44.27 | 41.76 | 94.33 |
| 5 | Cu | 39.73 | 36.45 | 91.74 |
| 6 | Fe | 33.64 | 9.27 | 27.56 |
| 7 | Mn | 38.30 | 26.38 | 68.88 |
| 8 | Zr | 26.24 | 9.60 | 36.59 |
| 9 | Ca | 65.41 | 55.94 | 85.52 |
| 10 | Co | 69.51 | 55.71 | 80.15 |
| 11 | Bi | 29.19 | 24.58 | 84.21 |
| 12 | Zn | 45.73 | 34.67 | 75.81 |
| 13 | None | 66.55 | 53.45 | 80.32 |

Examples 14 and 15

Multilayer ceramic capacitors were prepared using the technology described using electrodes containing Pd and Ag metal powders in a ratio of 30/70 by weight, 57.0% metal fraction in an organic medium comprising ethylhydroxyethyl cellulose in mineral spirits and alcohol solvents. Two electrodes were tested: one with only 1.5% wt. (on total paste basis) barium titanate sintering inhibitor and the other with the same barium titanate concentration plus 0.5% wt. (on total paste basis) Rh resinate sintering inhibitor. Dielectrics used were Z5U, X7R and NPO in nature, which were formulated to mature at 1080° to 1120° C. Parts were printed, subjected to a slow burnout to remove residual organics, and fired to a peak temperature of about 1100° C. Samples of the fired parts were cross-sectioned by mounting the parts in an epoxy potting compound and polishing to expose the inner structure. The parts prepared using the electrode containing the Rh resinate sintering inhibitor exhibited essentially no delaminations. On the other hand, approximately 20% of the parts prepared with the electrode containing no Rh resinate sintering inhibitor exhibited delaminations. The addition of an organometallic sintering inhibitor, in this case Rh, to the electrode significantly reduced the rate of delaminations in fired MLC parts.

I claim:
1. A thick film conductor composition suitable for use for electrodes in multilayer capacitors comprising
  (a) finely divided particles of electrically conductive metal selected from Pd, Ag, Pt, Au, Cu, Ni, oxide precursors and alloys of the aforesaid conductive metals, and mixtures thereof, dispersed in
  (b) an organic medium comprising
    (1) an organometallic compound, the metal or metal oxide moiety of which is insoluble in the electrically conductive metal and/or the oxide(s) of the metal moiety are non-reducing in the pres- ence of the electrically conductive metal, the organometallic compound being dissolved in;

(2) a solution of polymeric binder and volatilizable solvent, the amount of organometallic compound being such that the metal moiety thereof constitutes at least 0.05% by weight of the total composition.

2. The composition of claim 1 in which the electrically conductive metal consists essentially of Pd and Ag in a molar ratio of 30/70.

3. The composition of claim 2 in which the Pd and Ag are in the form of a mixture of Pd particles and Ag particles.

4. The composition of claim 1 which also contains 0.5-2.5% wt., basis total composition, of finely divided particles of $BaTiO_3$.

5. The composition of claim 1 in which the Pd and Ag are in the form of particles of Pd/Ag alloy.

6. The composition of claim 1 in which the volatile solvent comprises alpha/beta terpineols.

7. The composition of claim 6 in which the volatile solvent is a solution of alpha/beta terpineols and mineral spirits.

8. The composition of claim 1 in which the metal moiety of the organometallic compound is selected from the group consisting of Rh, Mn, Zr and mixtures thereof.

9. The composition of claim 1 in which the conductive metal particles are 0.1-10 microns in size.

10. A multilayer capacitor comprising a plurality of screen-printed and fired electrode layers of the composition of claim 1 sandwiched between dielectric layers.

* * * * *